United States Patent
Malgarini

(10) Patent No.: US 12,428,158 B2
(45) Date of Patent: Sep. 30, 2025

(54) AIRCRAFT PASSENGER SEATING ARRANGEMENT AND MOBILE ELEMENT FOR AIRCRAFT SEATS

(71) Applicant: GOOOD S.R.L., Latina (IT)

(72) Inventor: Ascanio Malgarini, Latina (IT)

(73) Assignee: GOOOD S.R.L., Latina (IT)

( * ) Notice: Subject to any disclaimer, the term of this patent is extended or adjusted under 35 U.S.C. 154(b) by 0 days.

(21) Appl. No.: 18/626,142

(22) Filed: Apr. 3, 2024

(65) Prior Publication Data

US 2024/0367797 A1 Nov. 7, 2024

(30) Foreign Application Priority Data

Apr. 4, 2023 (IT) .................. 102023000006618

(51) Int. Cl.
*B64D 11/06* (2006.01)

(52) U.S. Cl.
CPC ...... *B64D 11/0601* (2014.12); *B64D 11/0641* (2014.12); *B64D 11/0643* (2014.12)

(58) Field of Classification Search
CPC ............ B64D 11/0601; B64D 11/0602; B64D 11/0606; B64D 11/0643
See application file for complete search history.

(56) References Cited

FOREIGN PATENT DOCUMENTS

| EP | 1663781 B1 | 6/2006 |
|---|---|---|
| EP | 3583030 B1 | 4/2022 |
| EP | 4074600 A1 | 10/2022 |
| WO | WO 2015/104527 A1 | 7/2015 |

OTHER PUBLICATIONS

Search Report for IT Application No. 102023000006618, dated Sep. 28, 2023.

*Primary Examiner* — Timothy D Collins
*Assistant Examiner* — Terri L Filosi
(74) *Attorney, Agent, or Firm* — Knobbe, Martens, Olson & Bear, LLP

(57) ABSTRACT

An aircraft passenger seating arrangement includes at least two seats arranged one in front of the other along a longitudinal axis, with each seat provided with a seat portion and a backrest portion. At least a first front seat includes a footrest portion facing the second rear seat and arranged adjacent to the seat portion of the same seat separated by a partition wall. The two seats are spaced apart along the longitudinal axis by a first distance forming an interspace extending in a substantial width along a second axis transversal to the longitudinal axis. The arrangement further includes a mobile element independent from the two seats, arranged in the interspace corresponding to the footrest portion of the first seat and including an upper support surface arranged at the same height as the footrest portion of the first seat and of the seat portion of the second seat.

20 Claims, 8 Drawing Sheets

AIRCRAFT PASSENGER SEATING ARRANGEMENT AND MOBILE ELEMENT FOR AIRCRAFT SEATS

FIELD

The present invention relates to an aircraft seating arrangement.

In addition, the present invention relates to a mobile for airliners, specifically a mobile element suitable for integration into business class seating configurations.

More specifically, the present invention relates to an aircraft seating mobile suitable for integration into a business class seat, the configuration of which allows for an increase in the usable area, by a passenger in an aircraft seat, of the cabinet itself and the seat into which said mobile is integrated.

DESCRIPTION OF THE RELATED ART

At the state of the art, it is well known that seats and suites for passengers on airliners, particularly business class, offer additional comforts and ancillary services over and above a basic seat, e.g., economy class, such as accessories for the use of personal items during the flight, multimedia tools, storage compartments, and the ability to provide greater comfort during the flight.

In the design of such business class seats, passenger comfort is a key and critical aspect, and therefore allowing the passenger to take on multiple configurations in the seat improves their flight experience and reduces their stress.

In fact, aircraft seats can either recline or take on resting configurations during the flight. Particularly for long-distance flights, some seats are configured to take on a configuration reminiscent of a bed, such as by fully reclining the seat back, or by employing accessory structural elements within the seat or integrated into it.

Such elements and mechanisms that enable said type of "bed" configuration, which may be elements integrated directly into the seat, are often cumbersome, thus diminishing the space reserved for the passenger, or consisting of elaborate mechanical systems, thus involving a high level of maintenance.

In addition, such moving systems, comprising, for example, mechanical/electronic actuators and/or pneumatic systems, may require assistance from specialized personnel, who, in case the passenger is unable to use said systems configured to allow the seat to assume said "bed" configuration, must step in to help the passenger, thus taking up more work time during the flight.

An additional problem with the prior art is that such systems are a hindrance in terms of weight, a key factor in the design of said type of seating; which in fact adds additional weight to the vehicle, thus implying an overall increase in total weight, thus requiring more fuel (and expense).

Prior art patent document WO 2015/104527 A1 describes an aircraft seating arrangement comprising a movable filling surface that can be deployed to increase the sleeping space for the passenger. However, such a surface can only be used in the bed phase, as it does not allow the passenger to assume the seated position when unfolded.

Prior art patent document EP 3 583 030 B1 describes an aircraft seating arrangement comprising a side footrest portion integrated with the seat. Such a solution is not favorable because it does not allow, when arranging the aircraft space, to vary the pitch i.e., the pitch between seats arranged in multiple rows to maximize aircraft space while maintaining passenger comfort.

SUMMARY

The purpose of the present invention is to overcome the previously highlighted problems of the prior art, specifically that of integrating into an aircraft seat (specifically business class) an accessory mobile that allows the usable surface area of a passenger to be increased during flight. Specifically so as to allow the passenger to comfortably assume an additional resting position where he or she is lying down.

An additional purpose of the present invention is to overcome the above-mentioned problems of the prior art by employing the smallest possible footprint, in order to be able to give more space, to the passenger to improve his or her travel experience and perception of freedom of movement during flight.

An additional purpose is to provide such comforts to the passenger, and with a mechanism that is as light as possible, simple, and intuitive for the passenger, in order to allow it to be used quickly, e.g., without requiring specialized personnel and without necessarily requiring the installation of electronic devices.

It is, therefore, is an object of the present invention an aircraft passenger seating arrangement comprising at least two seats arranged facing each other along a longitudinal axis, each seat being provided with a seat portion and a backrest portion, at least a first front seat comprising a footrest portion facing the second rear seat and arranged adjacent to the seat portion of the same seat separated by a partition wall, said two seats being spaced apart along said longitudinal axis by a first distance such as to form an interspace extending in width along a second axis transversal to said longitudinal axis for substantially the area in width of said two seats, said arrangement of seats being characterised in further providing a mobile element independent from both said two seats, arranged in said interspace in correspondence of the footrest portion of the first seat and comprising an upper support surface arranged at the same height of the footrest portion of the first seat and of the seat portion of the second seat, in that said upper support surface of said mobile element is extensible in width along said second axis so that it assumes a first retracted configuration, wherein it fills the portion of said interspace in correspondence with the footrest portion of the first seat leaving the remaining portion of said interspace empty in at least a portion of said seat portion of said second seat for allowing the passenger to access said second seat and for accommodating the legs of the passenger seated on said second seat, and a second extended configuration wherein said upper support surface is more extended in width along said second axis than said retracted configuration, so as to fill almost completely also the remaining portion of said interspace along said second axis also in correspondence with said seat portion of said second seat for forming a single bed surface with said footrest portion of said first seat and said seat portion of said second seat.

In particular, according to the invention, the longitudinal development of said interspace may be substantially uniform and corresponds to said first distance. Still, according to the invention, the encumbrance according to a plan view of each seat may be substantially a parallelogram.

More specifically according to the invention, the encumbrance according to a plan view of said movable element may be substantially a parallelogram.

Always according to the invention, in at least one first seat the encumbrance according to a plan view of the seating portion may have a substantially rectangular trapezoid shape wherein the oblique side corresponds to a portion of said separation wall.

Further according to the invention, in said at least one first seat encumbrance according to a plan view of the footrest portion may have a substantially right triangle shape or a substantially right trapezoid shape, wherein the respective oblique side corresponds to a portion of said separation wall.

Preferably according to the invention, a portion of said separation wall of said at least one first front seat from a plan view may be oriented along a third axis inclined by a first angle in respect of said longitudinal axis comprised between 5° and 45°, preferably equivalent to 23°.

Further, according to the invention, the separation wall may also define the backrest portion and said footrest portion of the same seat.

Still, according to the invention, the backrest portion of each seat may have an extension in width oriented along an axis substantially parallel to said second axis.

Always according to the invention, said second axis may be inclined with respect to said longitudinal axis by an angle comprised between 45° and 135°, preferably between 70° and 110°, in particular equivalent to 78°.

Further according to the invention, in each seat said seat portion and said backrest portion may be fixed and devoid of movement mechanisms.

In particular, according to the invention, each seat may provide a back wall arranged rearwardly said backrest portion and above said footrest portion of said seat, preferably on said back wall being arranged a monitor.

More specifically according to the invention, said rear wall from a plan view may have an extension in width substantially parallel to said second axis.

Always according to the invention, said footrest portion of said at least one first seat may be closed at the top by said separation wall in such a way that said upper portion acts as a shelf surface for the passenger seated in the seating portion of said first seat.

Preferably according to the invention, said mobile element may comprise a support structure fixed in said interspace at said footrest portion of said first seat.

In particular according to the invention, said mobile element may comprise a first support panel and a second support panel, wherein in said retracted configuration of the mobile element said upper support surface corresponds to the upper surface of the first support panel, and wherein in said extended configuration of the mobile element said upper support surface corresponds to the upper surface of both said two support panels side by side.

Preferably according to the invention, said mobile element may comprise a storage compartment for storing said second panel when said mobile element is in said retracted configuration.

Further according to the invention, said storage compartment is arranged inferiorly to said first support panel when said mobile element is in said retracted configuration.

Always according to the invention, said storage compartment may be slidingly coupled along said second axis to said support structure and is configured in such a way that in said extended configuration of said mobile element said storage compartment is translated along said second axis for bringing said second panel side by side with said first panel.

In particular according to the invention, the sliding coupling between said storage compartment and said support structure may be via two side rails.

In addition according to the invention, said mobile element may provide actuating means, preferably mechanical, for example, linear levers, or electrical, associated with said support structure and with said storage compartment for causing or assisting the translation movement of said storage compartment.

Further according to the invention, said mobile element may provide a lifting system of said second panel inside said storage compartment such that when said mobile element is in an extended configuration, said second panel can be lifted with its respective upper surface in the same plane as the upper surface of the first panel for forming said upper support surface.

Alternatively according to the invention, said mobile element in said retracted configuration may comprise said first panel arranged over said second panel contained in said storage compartment, and wherein said first panel is rotationally constrained to said second panel in correspondence with a respective side so that, when said mobile element switches to said extended configuration, said first panel rotates 180° with respect to said second panel.

In particular, according to the invention, said mobile element may provide a lifting system for lifting said second support panel from said storage compartment before rotating said first support panel for obtaining the extended configuration.

More specifically according to the invention, said lifting system may provide at least one plurality of levers associated with said storage compartment and with said second panel.

Preferably according to the invention, said mobile element may provide a handle element, in particular a flap, apt to be pulled by a user to bring said mobile element from said retracted configuration to said extended configuration.

In particular, according to the invention, said handle element may be associated with said storage compartment so as to facilitate its translation.

More specifically according to the invention, said handle element may be associated with said second support panel in such a way as to facilitate lifting of said second support panel.

Still according to the invention, said second panel may be rotationally constrained to said first panel at a respective side, wherein in said retracted configuration said second panel is arranged at 90° with respect to said first support panel, and in said extended configuration said second panel is arranged at 180° to said first support panel.

Preferably according to the invention, said mobile element may comprise a storage compartment.

Further according to the invention, said storage compartment may be arranged underneath said upper support surface and wherein it is accessible at the face facing the seat portion of the second seat.

Finally according to the invention, said storage compartment may be obtained at the upper support surface of said mobile element and provides an upper closing panel.

Additionally, it is object of the present invention a mobile element for aircraft seats apt to be arranged in the interspace between two seats arranged opposite each other in an arrangement as described above.

BRIEF DESCRIPTION OF THE DRAWINGS

The invention will now be described by way of illustration but not limitation, with special reference to the drawings in the attached figures, in which:

FIGS. 6b-9b show side views of the mobile element from FIGS. 6a-9a, respectively;

DETAILED DESCRIPTION

Figure 1:
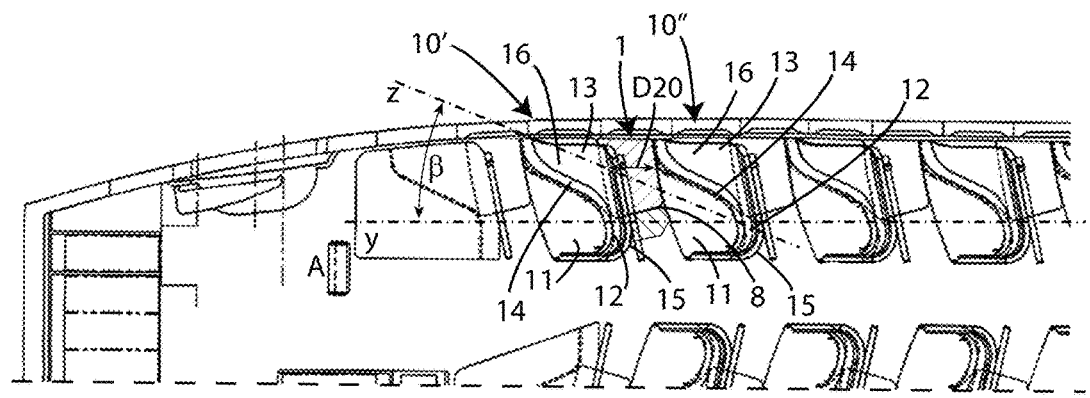
FIG. 1 shows a plan view of a portion of an aircraft including an aircraft seating arrangement according to the present invention.

Looking at FIGS. 1-5, a passenger seating arrangement 10', 10" for aircraft according to the invention is shown.

The seating arrangement 10', 10" is configured as an assembly consisting of a pair of the seats 10', 10", arranged opposite each other along a longitudinal y-axis and oriented concordantly along said longitudinal y-axis, e.g., along the direction in which the aircraft cabin is spread and/or the direction of flight.

Said seats 10', 10" may be at a side wall of the aircraft cabin and accessible from one side via an aisle or at the central portion of the aircraft cabin adjacent to other seats and an access aisle or between two access aisles.

The seat assembly also provides for a mobile element 1 that is structurally and functionally independent, i.e., it can be installed independently of the two seats 10', 10" and does not require any interaction with them for its proper use; in fact, it is attached to the floor of the aircraft by its interface structure, just as the seats 10', 10" are in their turn, thus making it considerable as a static element of the aircraft.

In the pair of seats, positioned longitudinally at a first distance $D_{20}$ or pitch between two seats (also called "pitch" in English), it is possible to define a first and a second seat 10', 10" (specifically placed opposite each other), which each include in their structure a seat portion 11 and a backrest portion 12.

At least one of the two seats 10', 10", in the example both, provides, in addition, a footrest portion 13, divided by a partition 14. Specifically, the footrest portion 13 of the first seat 10' faces the second seat 10". The distance $D_{20}$ allows to further define a free space or interspace 20 located between the two seats 10', 10". Said interspace 20 is developed in width along a second x-axis, transverse to the longitudinal y-axis, in particular, inclined by an angle α between 45° and 135°, preferably between 70° and 110°, in particular equivalent to 78°.

The mobile element 1, according to the invention, is designed to be positioned in the interspace 20, longitudinal extension along the y-axis is essentially uniform whose length corresponds to the distance $D_{20}$ between the two seats 10', 10", between the footrest portion 13 of the first seat 10' and the seat portion 11 of the second seat 10". In fact, the mobile element 1 has a support surface 8 arranged at the same height as the footrest portion 13 and seat portion 11 (which are placed at the same height in turn) in order to create a single substantially continuous surface between the two seats 10', 10". Additionally, the upper surface 8 of the mobile element 1 is apt to extend along the second x-axis, thereby increasing its overhead, moving from a first configuration (in which the passenger is seated, shown in FIG. 2) to a second use configuration (in which the passenger is lying down, shown in FIG. 3) and thus optimizing the space in the cabin. Said support surface 8 of said mobile element 1 is then extendable and retractable in width along said second x-axis to alternately assume said retracted configuration and said extended configuration.

In the first use configuration, also called the "retracted" configuration, the top surface 8 fills the interspace 20 only partially, leaving a portion of the edge of the seat portion 11 free in order to allow the passenger using seat 10" to comfortably access seat 10" and position his or her legs in the remaining space of the interspace 20 between the seat portion 11 and the backrest 12 of the first seat 10'.

In the present embodiment said seat portion 11 and said backrest 12 of each seat 10', 10" are fixed and rigid mechanical elements, which have no mechanical or electrical movement mechanism.

The second use configuration, also called "extended", involves the support surface 8 of the mobile element 1 filling almost completely the interspace 20, increasing its surface area along the direction defined by the second x-axis, thus aligning with the entire edge of the seat portion 11 of the second seat 10" between the two seats 10', 10".

The second "extended" use configuration makes it possible to create a single surface, large enough for the passenger to be able to fully lie down, using the seat portion 11 of the second seat 10", the surface 8 and the footrest portion 13 of the first seat 10' as a single surface, like a bed, thanks to the mobile element 1 that extends the horizontal surface between the seats 10', 10" in order to be able to rest and/or sleep in a lying position.

Figure 2:
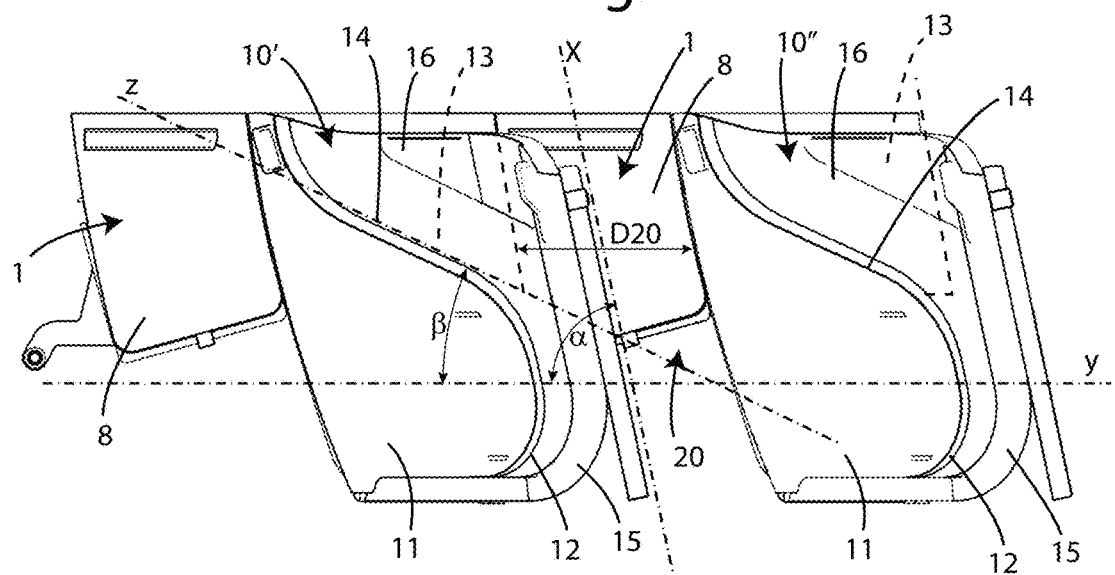
FIG. 2 shows a plan view of the aircraft seating arrangement according to the present invention comprising two seats arranged facing each other with a mobile element in between in a first retracted configuration.
Figure 3:
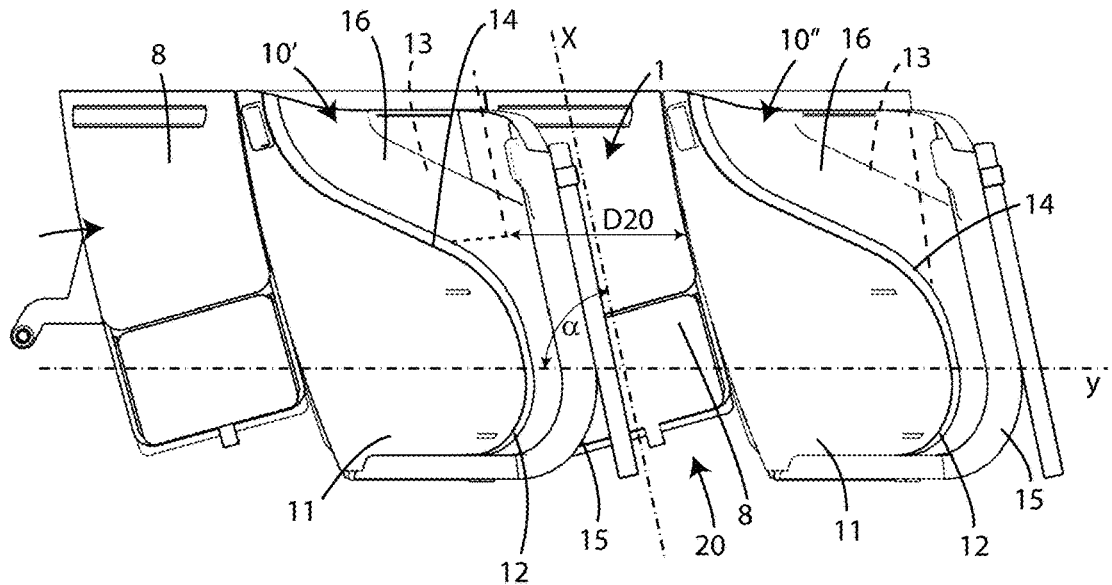
FIG. 3 shows a plan view of the aircraft seating arrangement in FIG. 2 with the mobile element in a second extended configuration.
Figure 4:
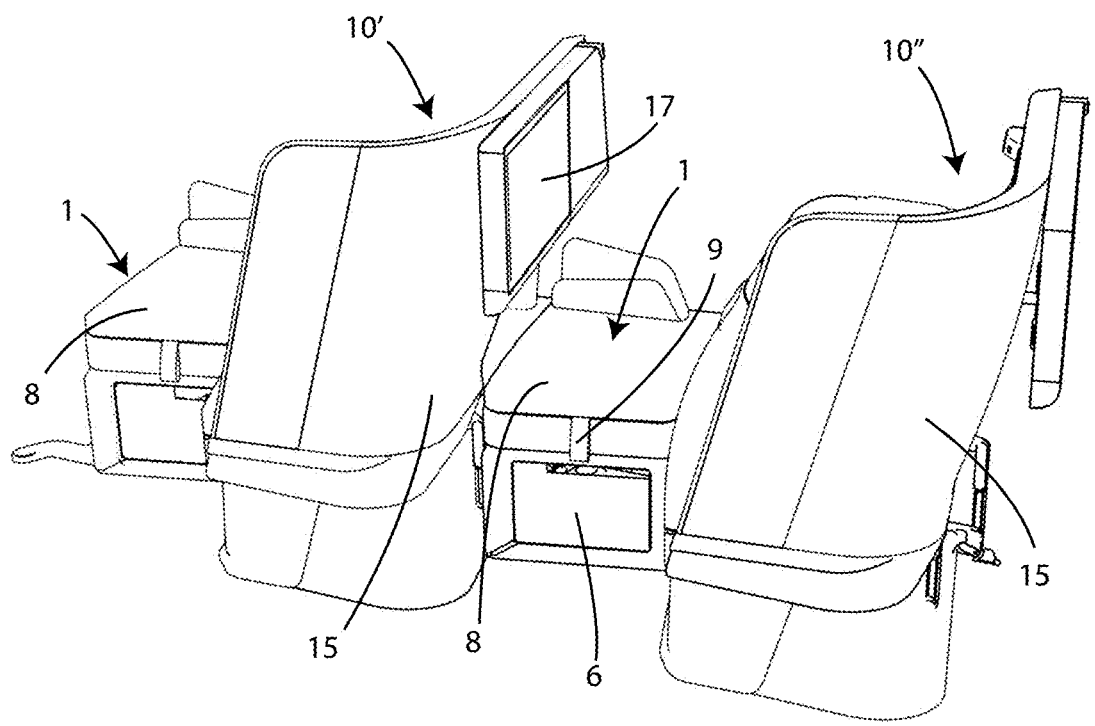
FIGS. 4 and 5 show side perspective views of the seating arrangements in FIGS. 2 and 3, respectively.
Figure 5:
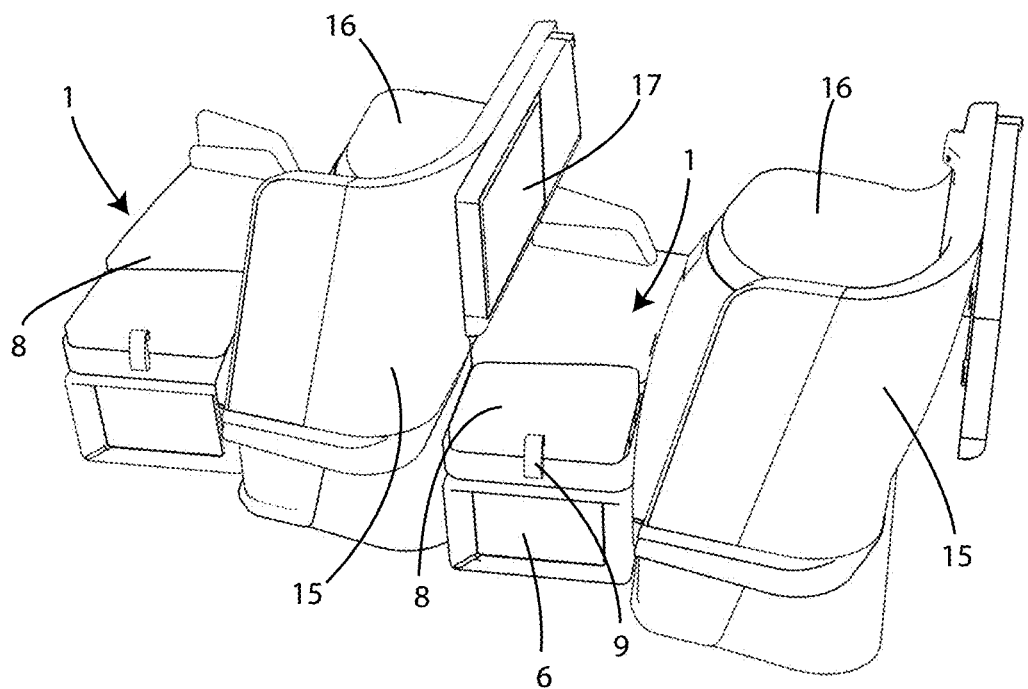
Figure 6A:
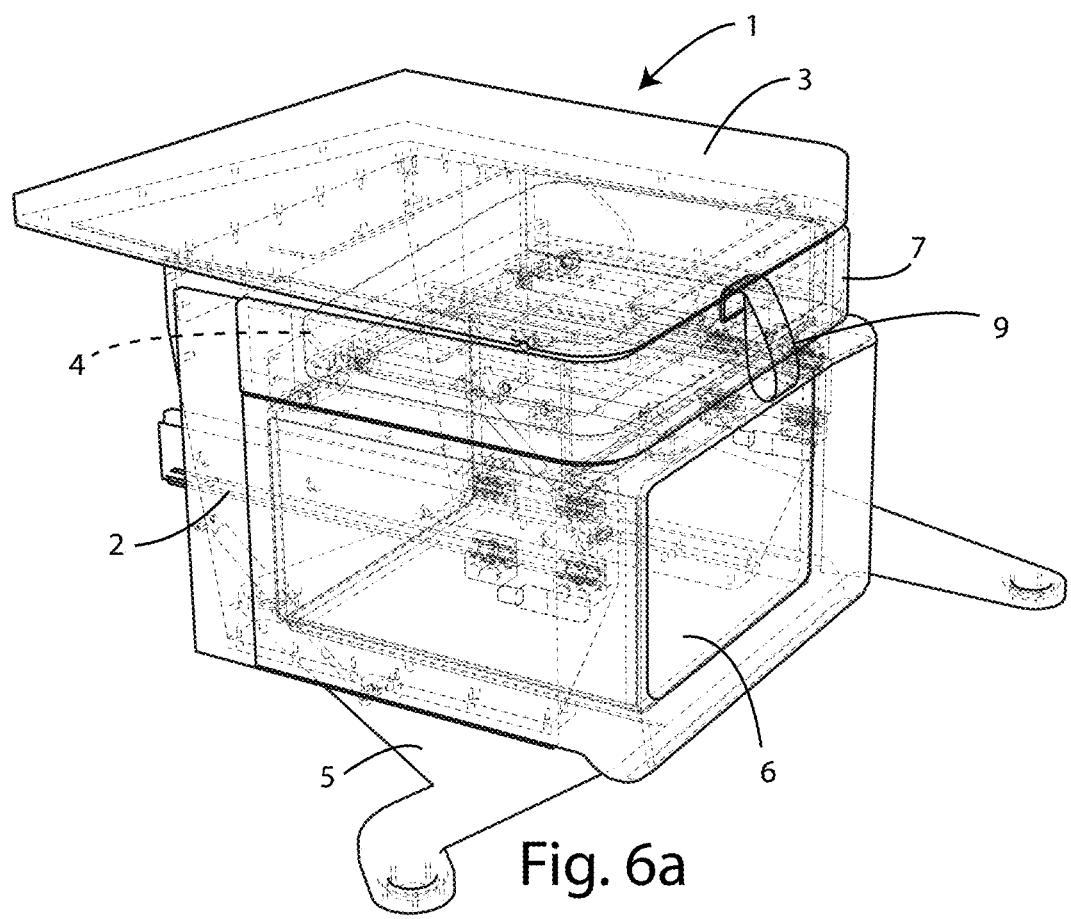
FIG. 6a shows a perspective view of the mobile element according to the invention in a first form of embodiment in a closed use or retracted configuration.
Figure 6B:
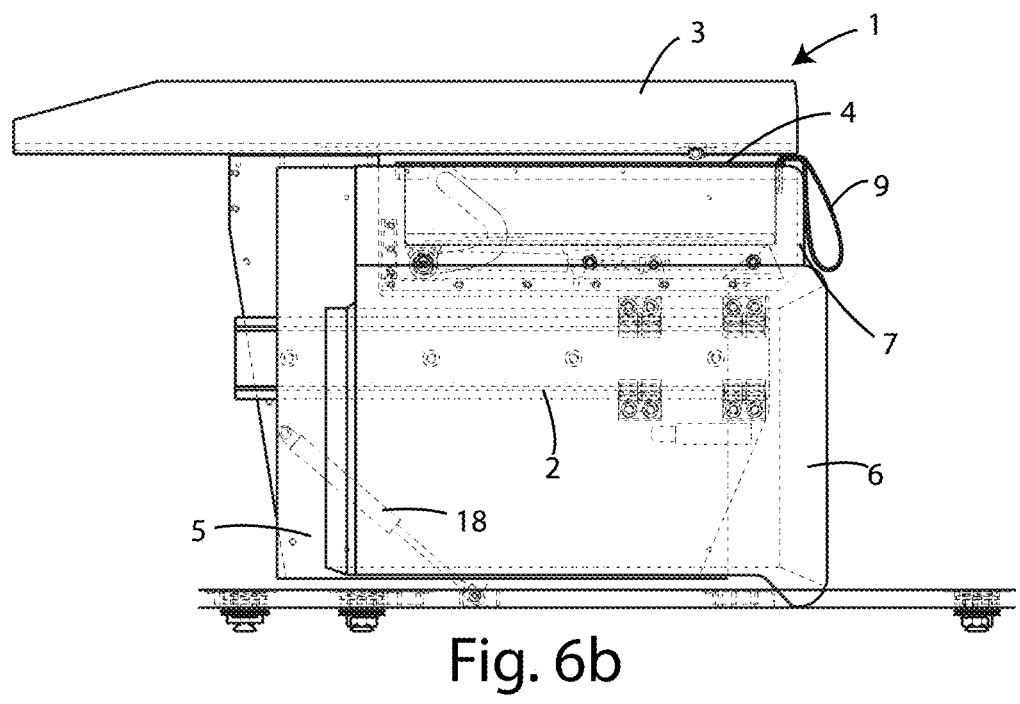
Figure 7A:
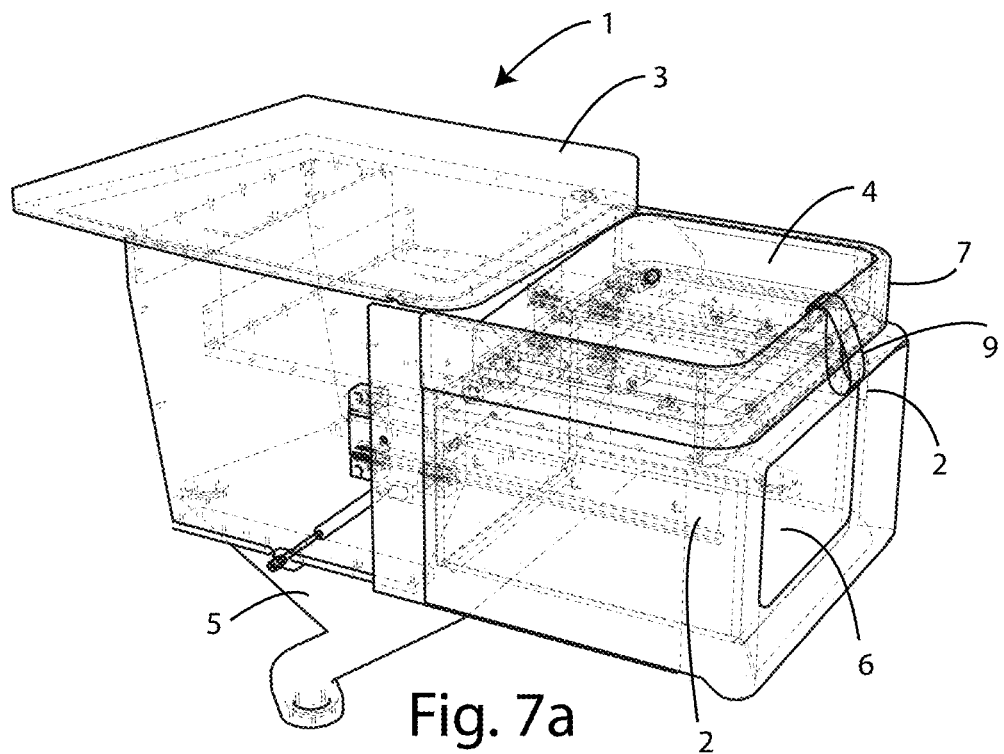
FIG. 7a shows a perspective view of the FIG. 6a mobile element in an intermediate use configuration.
Figure 7B:
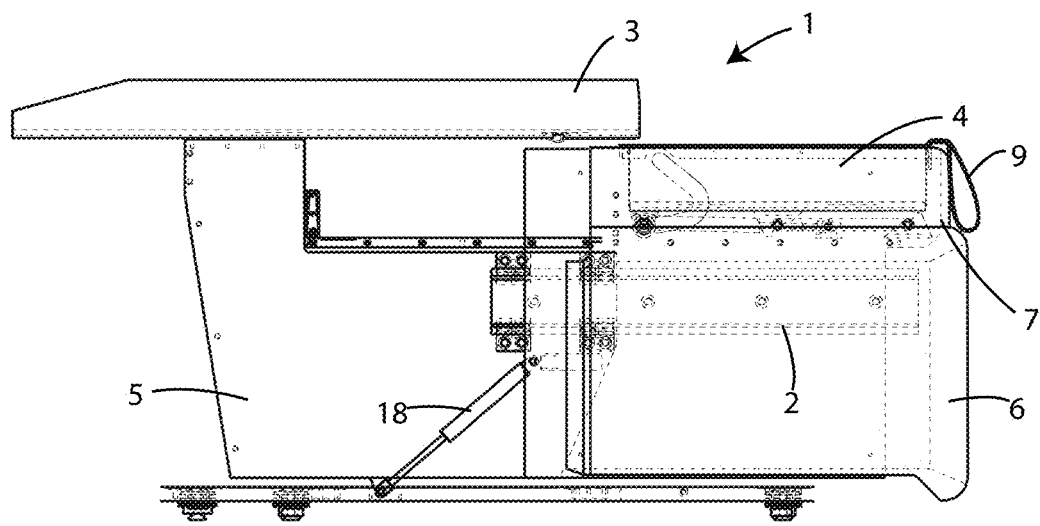
Figure 8A:
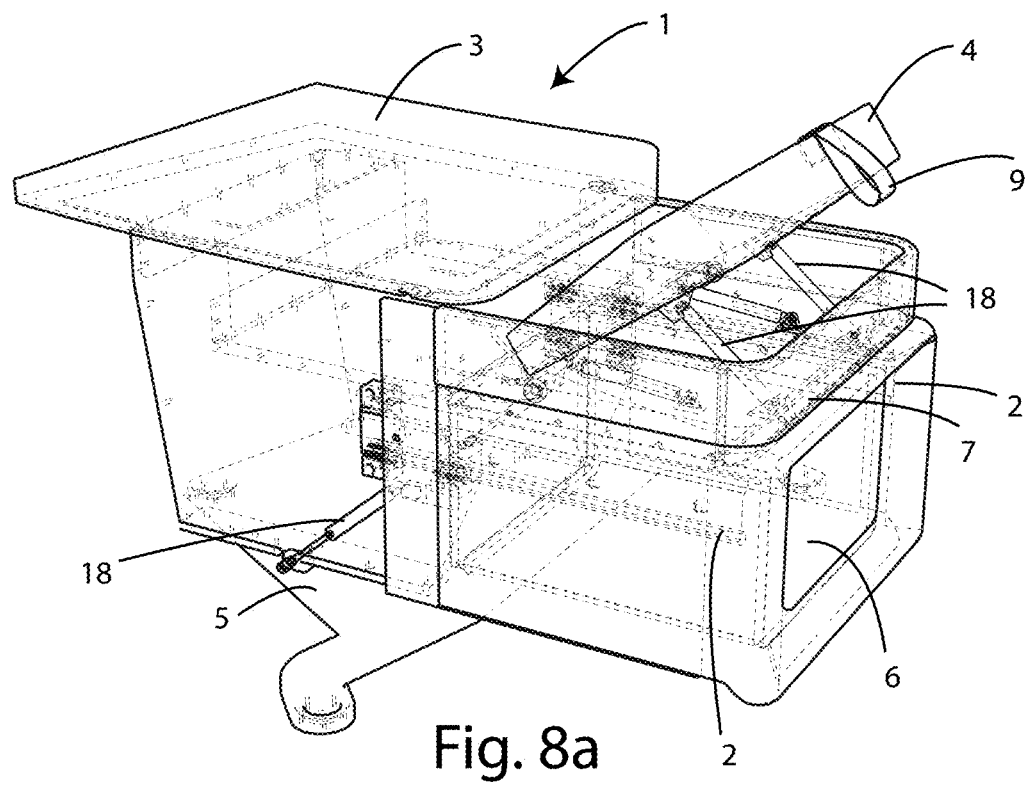
FIG. 8a shows a perspective view of the mobile element in FIG. 6a in a second intermediate use configuration.
Figure 8B:
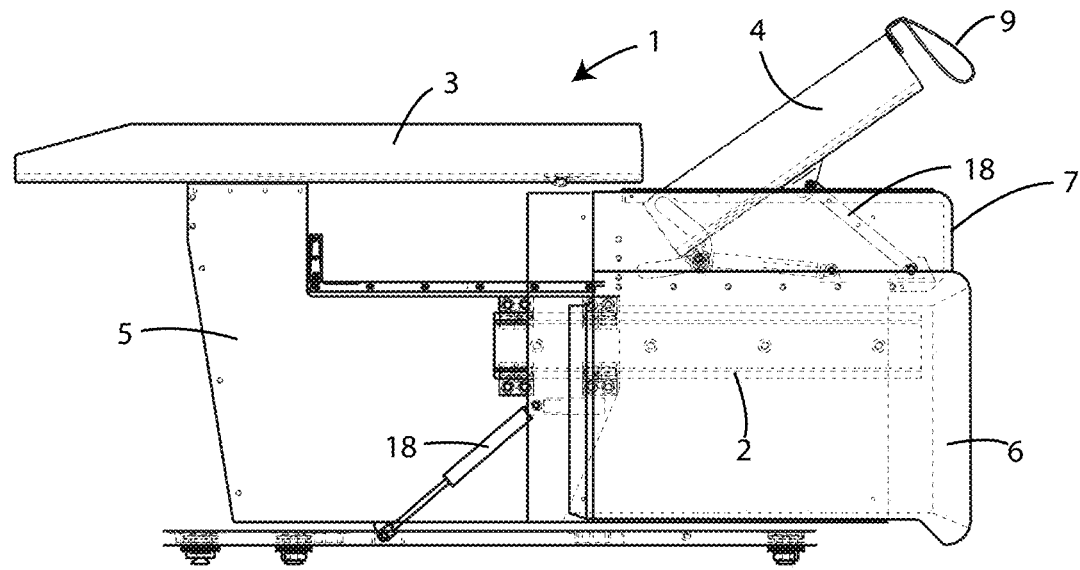
Figure 9A:
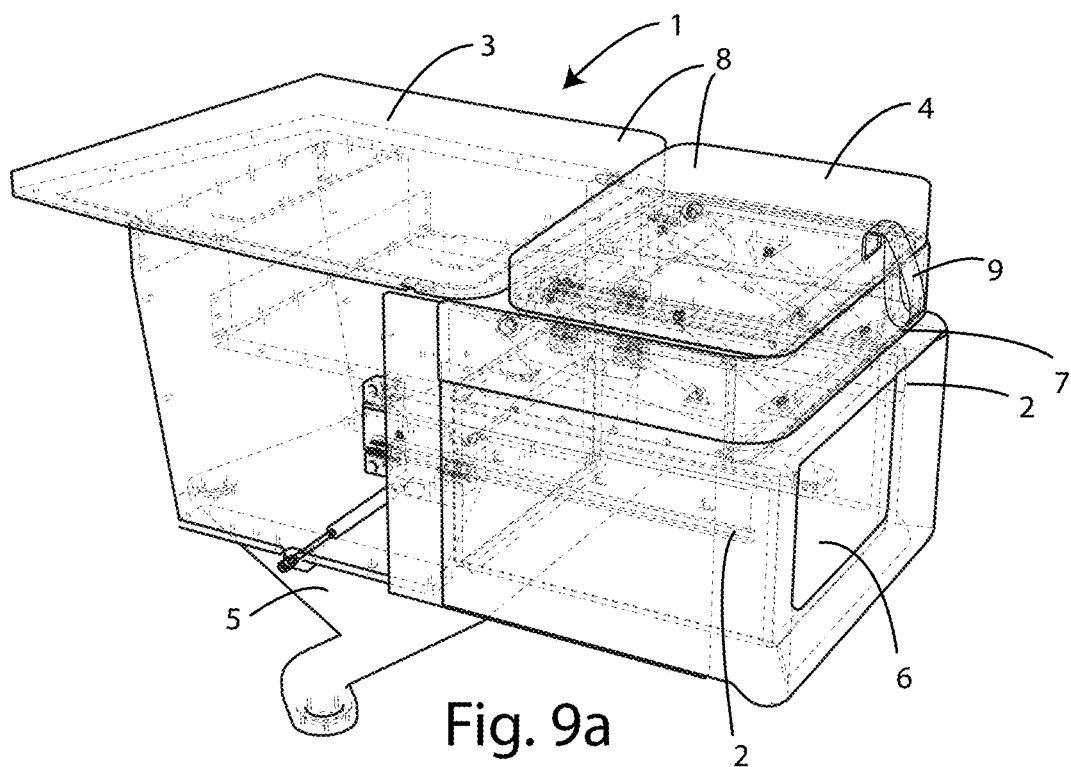
FIG. 9a shows a perspective view of the mobile element in FIG. 6a in an open-use or extended configuration.
Figure 9B:
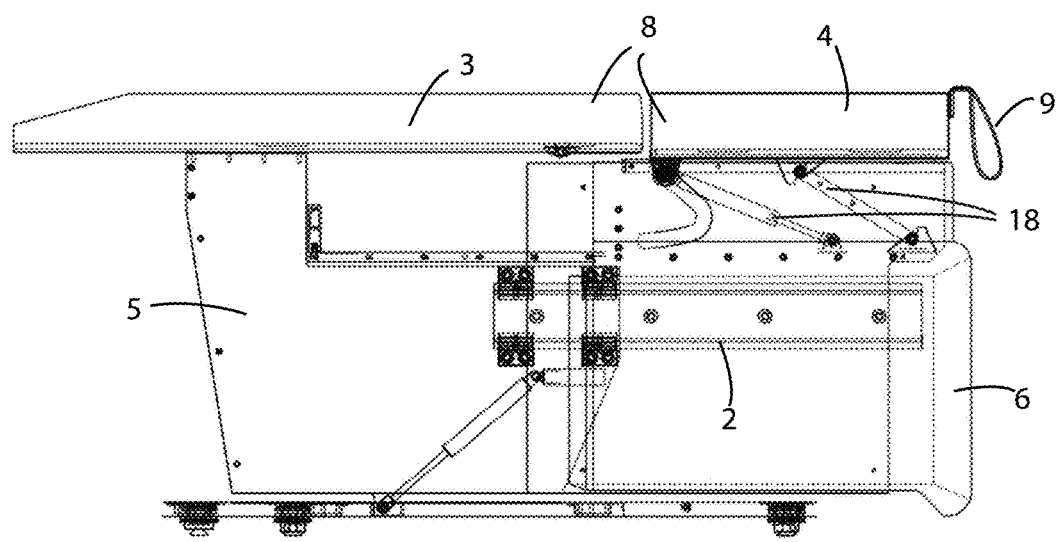

With reference in particular to FIGS. 2-3, it is possible to visualize the plan arrangement of the seats 10', 10" facing each other and the mobile element 1 interposed between them. From this view, it can be seen that the overall dimensions of the two seats 10', 10" and mobile element 1 basically correspond to a parallelogram.

In such an arrangement of seats 10', 10", the footrest portion 13 included in the first seat 10', 10" has an elongated plan footprint, in particular in the shape of a triangle or trapezoid, having a side parallel to said longitudinal axis y and an oblique side coincident with a portion of said partition wall 14; which defines at the same time the, substantially right, trapezoidal footprint of the seat portion 11 of seat 10', 10", in which a portion of said partition wall 14 forms the oblique side of the trapezoid.

Referring to FIG. 1, according to the invention, the partition wall 14 of the first front seat 10' is oriented along a third z-axis, inclined by a first angle β, between 5° and 45°, with respect to the longitudinal y-axis preferably equivalent to 23°, which indicates the orientation in which the passenger reclines when the movable element is in said "extended" configuration.

The partition wall further defines the footrest portion 13 of the seats 10', 10" and the backrest 12 of the seats 10', 10" themselves, in particular, the latter presents an extension in width oriented along an axis parallel to the second x-axis. Adjacent to said separation wall 14, with particular reference to FIGS. 4-5, there is arranged, posterior to said footrest portion 13 of the seat 10', 10", a rear wall 15 for the installation of accessory elements to the seat 10', 10" itself, in particular a monitor 17, having a characteristic width oriented along the second transverse axis x. Further in said figures, it is possible to visualize how, according to the invention, the footrest portion 13 of the first seat 10', 10" is closed superiorly by the separation wall 14, so as to advantageously define an upper portion 16, usable by the passenger seated on the seat portion 11 of the first seat 10', 10" as a support surface, for example for the elbow or personal objects.

With reference to FIGS. 6a-15, mobile element 1, in its three embodiments, is now described below.

Said mobile element 1, rigidly placed in the interspace 20 at the footrest portion 13 of the first seat 10' has a support structure 5 to support all its components, particularly a first and second panel (which may consist of an upholstered padded element) support 3, 4 installed in said structure.

Specifically, when the mobile element 1 is in said "retracted" configuration, the supporting surface 8 coincides with the surface of the first supporting panel 3, while when the movable element is in said "extended" configuration, the supporting surface 8 coincides with the surface of both supporting panels 3, 4 side by side.

In addition, as shown for the embodiment forms of FIGS. 6a-9a, 6b-9b, and 12-14, within the support structure 5 of the movable element, a storage compartment 7 may be provided, located below to the first support panel 3, designed to contain the second support panel 4 when the mobile element is in said "retracted" configuration and to contain a storage compartment 6 arranged inferiorly to the support surface 8, accessible at the face facing the seating portion 11 of the second seat 10".

In a first embodiment, visible in FIGS. 6a-9b, of the mobile element 1, it is provided that said storage compartment 7 can be slidingly coupled to the support structure 5 along the second x-axis, in particular through the use of two linear side rails 2, so that when the mobile 1 is in said "extended" configuration, the storage compartment 7 translates, thus adjoining the second panel 4, contained in said storage compartment 7, to the first panel 3. Such movement of the compartment 7, and thus also the alignment of the second panel 4, takes place by means of movement mechanical means, such as actuators or levers 18, or movement electric means, installed in the support structure 5 and associated with the compartment 7 itself, in particular, capable of moving along a specially shaped guide and/or by other pairs of levers 18. In this embodiment the panel 4, when the mobile element is in said "retracted" use configuration, is contained within compartment 7 and placed adjacent inferiorly to the first support plane 3, thus minimizing the total footprint of the mobile element 1. In the transition between the two use configurations and simultaneously with the translation of compartment 7 on the two side rails 2, there is a lifting system associated with the second panel 4 in the support structure 5, so that it is raised and thus its upper surface is aligned with the surface of the first panel 3 when the mobile element is in said "extended" configuration.

Figure 12:
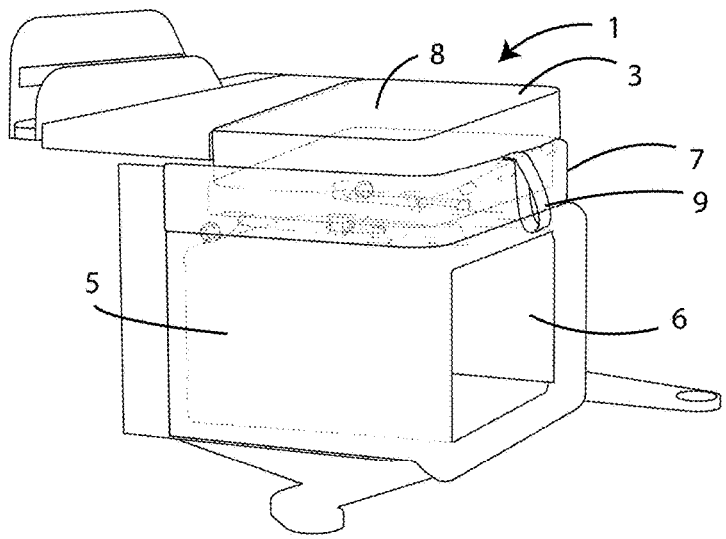
FIG. 12 shows a perspective view of the mobile element according to the invention in a third embodiment in a closed use or retracted configuration.
Figure 13:
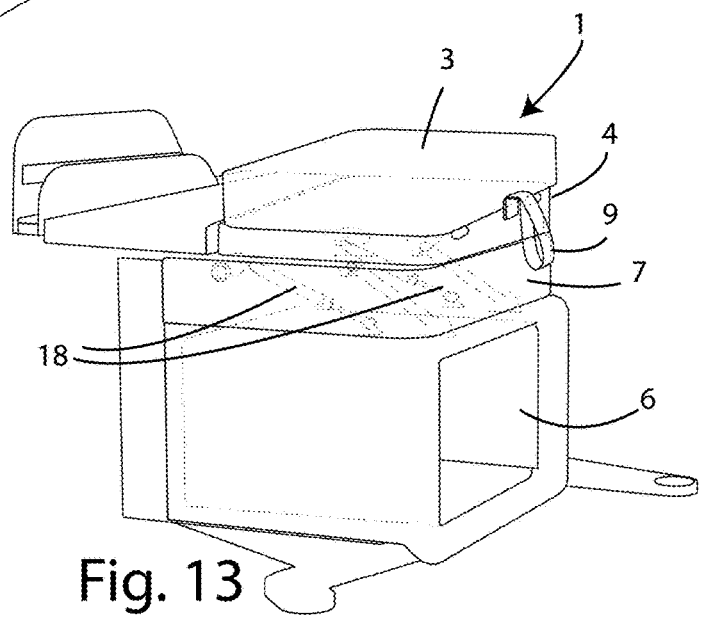
FIG. 13 shows a perspective view of the mobile element in FIG. 12 in an intermediate use configuration.
Figure 14:
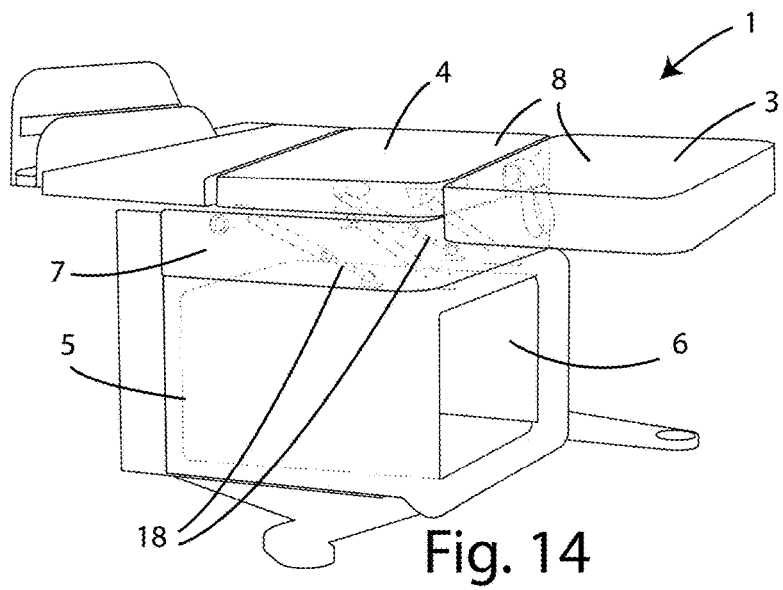
FIG. 14 shows a perspective view of the mobile element in FIG. 12 in an open use or extended configuration.

With reference to FIGS. 12-14, a further embodiment of the mobile element 1 is described, in which, when it is in said "retracted" configuration, the first panel 3 is arranged superior to the second panel 4 (contained in the storage compartment 7) and is constrained in rotation with respect to the second panel 4 itself so that, in the transition between the two configurations of use, it (the panel 3) rotates by an angle of 180° with respect to the second panel 4. In such an embodiment, before the rotation of the first panel 3, the lifting means, specifically a plurality of levers 18, are provided to lift the second panel 4 and bring it out of the storage compartment 7 to achieve the "extended" use configuration of the mobile element 1.

In the two just described embodiments, the mobile element 1 can provide for a handle element 9, specifically a flap 9, installed to be pulled by a user, a skilled operator or a passenger, to operate the lifting and/or linear movement systems of the storage compartment 7, in such a way as to switch from the "retracted" to the "extended" use configuration. In fact, in the first embodiment, the flap 9 is associated with the storage compartment 7 to facilitate its translation along the x-axis, while in the second embodiment the flap 9 is associated with the second panel 4 to facilitate its lifting. Further, according to the invention, in order to slow down such movements described above, the translation of the compartment 7 and the rotation of the second support panel 4, dampers may be provided in order to slow down its travel by controlling it.

Figure 10:
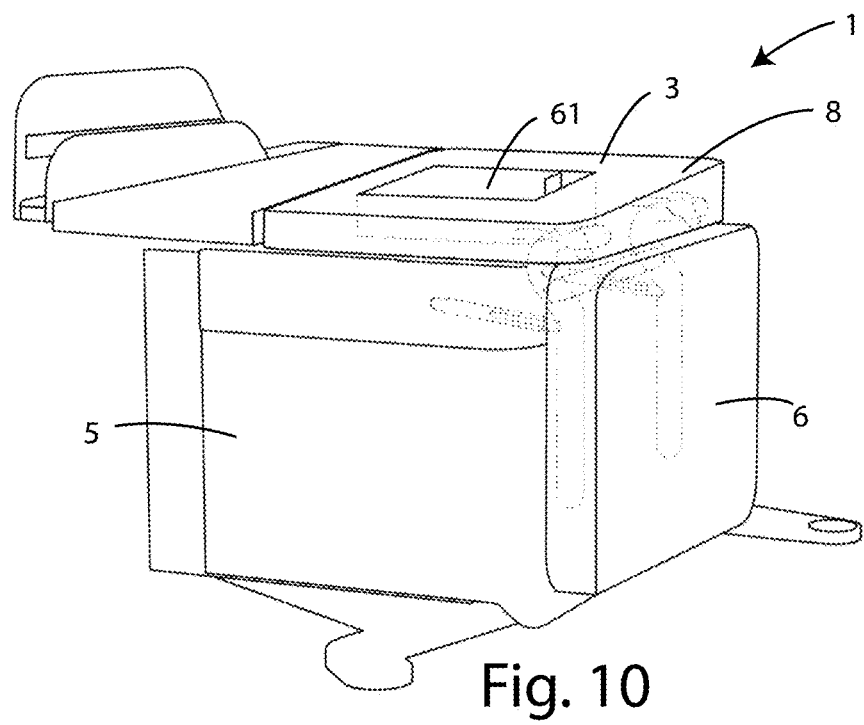
FIG. 10 shows a perspective view of the movable element according to the invention in a second embodiment in a closed use or retracted configuration.
Figure 11:
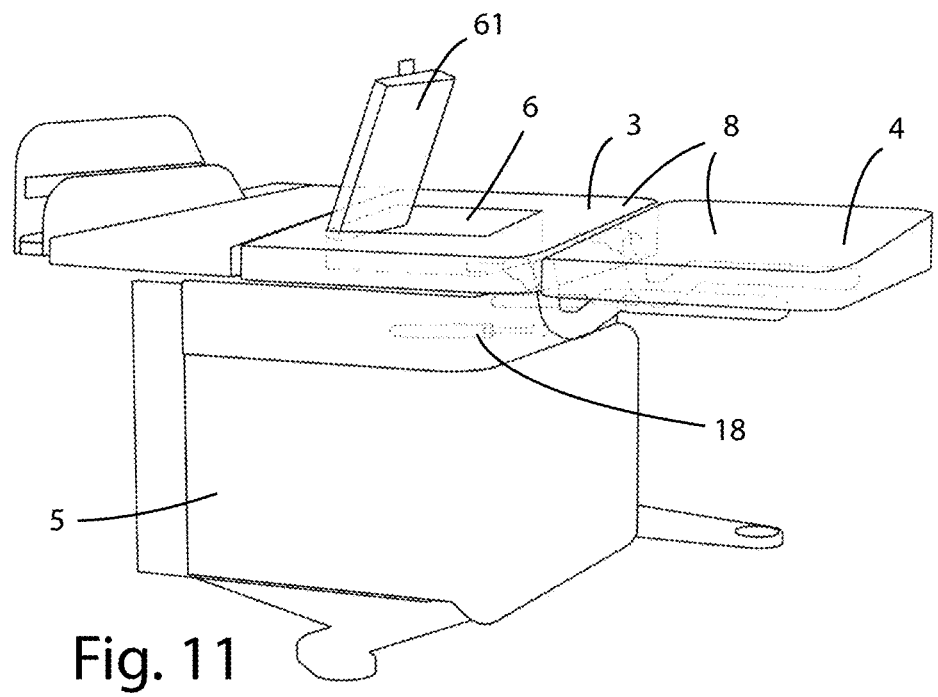
FIG. 11 shows a perspective view of the mobile element in FIG. 10 in an open use or extended configuration.

With reference to FIGS. 10-11, a further embodiment of the mobile element 1 is described, in which the second panel 4 is rotatably constrained to the first panel 3 at one side of it. This arrangement of the two panels ensures that when the mobile element 1 is in the "retracted" configuration, the second panel 4 is positioned at 90° relative to the first panel 3, and when it is in the "extended" configuration, the second panel 4 is positioned at 180° relative to the first panel 3, thus aligning and creating a larger support surface 8 for the passenger.

Further in this embodiment, an upper closing door 61 may be provided at the upper support surface 8 to access the storage compartment 6.

In the present text the mobile element 1 is always described in combination with the arrangement of two seats, it is apparent that it is also the subject of the present invention independently of these seats.

Advantageously, the seating arrangement according to the invention provides excellent passenger comfort while making practical use of cabin space.

Even more advantageously, the mobile element according to the invention allows the pitch between two seats to be varied by simply changing their dimensions in width and/or length during design or manufacture, without having to change the seat modules themselves.

In addition, the solution according to the invention allows an accessory mobile to be integrated into an aircraft seat (specifically business class) to increase the usable surface area for a passenger during a flight.

Advantageously, the solution according to the invention makes it possible to provide comfort to the passenger while reducing the weight of the structure and facilitating the passenger's movement on the seat, without requiring specialized personnel and without necessarily requiring the installation of electronic devices.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. An aircraft passenger seating arrangement comprising:
    at least two seats arranged one in front of the other along a longitudinal axis (y) including a first front seat and a second rear seat,
    wherein each seat of the at least two seats is provided with a seat portion and a backrest portion,
    wherein the first front seat comprises a footrest portion facing the second rear seat and arranged adjacent to the seat portion of the first front seat separated by a partition wall, and
    wherein the at least two seats are spaced apart along the longitudinal axis (y) by a first distance, forming an interspace with a width along a second axis (x) transversal to the longitudinal axis (y), the width of the interspace corresponding to a width of the at least two seats along the second axis (x); and
    a mobile element independent from both of the at least two seats, arranged in the interspace corresponding to the footrest portion of the first front seat and comprising an upper support surface arranged at the same height as the footrest portion of the first front seat and of the seat portion of the second rear seat,
    wherein the upper support surface of the mobile element is configured to be extensible and retractable in width along the second axis (x) so that it assumes a retracted configuration and an extended configuration,
    wherein, in the retracted configuration, the upper support surface of the mobile element fills a portion of the interspace corresponding to the footrest portion of the first front seat, leaving a remaining portion of the interspace empty in at least a portion of the seat portion of the second rear seat, allowing a passenger to access the second rear seat, and accommodating legs of the passenger seated on the second rear seat, and
    wherein, in the extended configuration, the upper support surface of the mobile element is extended more in width along the second axis (x) in comparison to the retracted configuration, filling at least a portion of the remaining portion of the interspace left empty in the retracted configuration along the second axis (x), and forming a single bed surface with the footrest portion of the first front seat and the seat portion of the second rear seat.

2. The seating arrangement according to claim 1, wherein a longitudinal dimension of the interspace is uniform and corresponds to the first distance.

3. The seating arrangement according to claim 1, wherein in at least the first front seat, a footprint according to a plan view of the seat portion comprises a rectangular trapezoid shape, wherein an oblique side of the rectangular trapezoid shape corresponds to a portion of the partition wall.

4. The seating arrangement according to claim 3, wherein in at least the first front seat, a footprint according to a plan view of the footrest portion comprises a right triangle shape or a right trapezoid shape, wherein an oblique side of the right triangle shape or the right trapezoid shape corresponds to a portion of the partition wall.

5. The seating arrangement according to claim 1, wherein a portion of the partition wall of the first front seat according to a plan view is oriented along a third axis (z) inclined by a first angle (β) with respect to the longitudinal axis (y) between 5° and 45°.

6. The seating arrangement according to claim 5, wherein the first angle (β) equals to 23°.

7. The seating arrangement according to claim 1, wherein the partition wall defines the backrest portion and the footrest portion of the same seat.

8. The seating arrangement according to claim 1, wherein the second axis (x) is inclined with respect to the longitudinal axis (y) by an angle (a) between 45° and 135°.

9. The seating arrangement according to claim 8, wherein the angle (α) is between 70° and 110° or equals to 78°.

10. The seating arrangement according to claim 1, wherein in for each seat of the at least two seats, the seat portion and the backrest portion are fixed and devoid of movement mechanisms.

11. The seating arrangement according to claim 1, wherein the mobile element comprises a support structure fixed in the interspace at the footrest portion of the at least one-first front seat.

12. The seating arrangement according to claim 1, wherein the mobile element comprises a first support panel and a second support panel,
    wherein, in the retracted configuration, the upper support surface of the mobile element corresponds to an upper surface of the first support panel, and
    wherein, in the extended configuration, the upper support surface of the mobile element corresponds to an upper surface of both the first support panel and the second support panel side by side.

13. The seating arrangement according to claim 12, wherein the mobile element comprises a storage compartment for storing the second support panel when the mobile element is in the retracted configuration.

14. The seating-arrangement according to claim 13, wherein the storage compartment is arranged below the first support panel when the mobile element is in the retracted configuration.

15. The seating arrangement according to claim 14, wherein the mobile element comprises a support structure fixed in the interspace at the footrest portion of the first front seat, and
    wherein the storage compartment is slidingly coupled along the second axis (x) to the support structure and is configured in such a way that, in the extended configuration of the mobile element the storage compartment is translated along the second axis (x) to bring the second support panel side by side with the first support panel.

16. The seating arrangement according to claim 15, wherein a sliding coupling between the storage compartment and the support structure comprises two side rails.

17. The seating arrangement according to claim 15, wherein the mobile element comprises actuating means associated with the support structure and with the storage compartment for causing or assisting a translation movement of the storage compartment, wherein the actuating means is mechanical or electrical.

18. The seating arrangement according to claim 17, wherein the actuating means comprises linear levers.

19. The seating arrangement according to claim 15, wherein the mobile element comprises a lifting system of the second support panel inside the storage compartment such that when the mobile element is in the extended configuration, the second support panel is lifted with its respective upper surface in the same plane as the upper surface of the first support panel for forming the upper support surface.

20. The seating-arrangement according to claim 19, wherein the lifting system comprises at least one lever associated with the storage compartment and with the second support panel.

* * * * *

UNITED STATES PATENT AND TRADEMARK OFFICE
CERTIFICATE OF CORRECTION

PATENT NO. : 12,428,158 B2
APPLICATION NO. : 18/626142
DATED : September 30, 2025
INVENTOR(S) : Malgarini It is certified that error appears in the above-identified patent and that said Letters Patent is hereby corrected as shown below:

In the Specification

Column 2, Line 26, delete "therefore, is an" and insert -- therefore, an --.

Column 2, Line 26, delete "present invention an" and insert -- present invention to disclose an --.

Column 2, Line 28, delete "arranged facing each other" and insert -- arranged one in front of the other --.

Column 5, Line 6, delete "arranged facing each other" and insert -- arranged one in front of the other --.

Column 6, Line 13 (approx.), delete "has a support" and insert -- has an upper support --.

Column 6, Line 18 (approx.), delete "the upper surface" and insert -- the upper support surface --.

Column 6, Line 24 (approx.), delete "cabin. Said support" and insert -- cabin. Said upper support --.

Column 6, Line 29, delete "the top surface" and insert -- the upper support surface --.

Column 6, Line 40, delete "involves the support" and insert -- involves the upper support --.

Column 6, Line 48, delete "10″, the surface" and insert -- 10″, the upper support surface --.

Column 6, Line 54-55, delete "10″ facing each other" and insert -- 10″ one in front of the other --.

Column 7, Line 33, delete "configuration, the supporting surface" and insert -- configuration, upper support surface --.

Signed and Sealed this
Tenth Day of February, 2026

John A. Squires
*Director of the United States Patent and Trademark Office*

CERTIFICATE OF CORRECTION (continued)
U.S. Pat. No. 12,428,158 B2

Column 7, Line 35-36, delete "configuration, the supporting surface" and insert -- configuration, upper support surface --.

Column 7, Line 44, delete "to the support" and insert -- to the upper support --.

Column 8, Line 43, delete "a larger support" and insert -- a larger upper support --.

In the Claims

Column 9, Claim 1, Line 32, delete "and of the" and insert -- and the --.

Column 10, Claim 8, Line 13, delete "angle (a) between" and insert -- angle ($\alpha$) between --.

Column 10, Claim 11, Line 22-23, delete "the at least one-first" and insert -- the first --.

Column 10, Claim 14, Line 38, delete "The seating-arrangement according" and insert -- The seating arrangement according --.

Column 11, Claim 20, Line 4, delete "The seating-arrangement according" and insert -- The seating arrangement according --.